(12) United States Patent
Stefansson et al.

(10) Patent No.: US 11,890,686 B2
(45) Date of Patent: *Feb. 6, 2024

(54) MILLING INSERT AND A SIDE AND FACE MILLING TOOL

(71) Applicant: SANDVIK INTELLECTUAL PROPERTY AB, Sandviken (SE)

(72) Inventors: Linda Stefansson, Sandviken (SE); Ulrik Sunnvius, Gavle (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/112,333

(22) Filed: Feb. 21, 2023

(65) Prior Publication Data
US 2023/0191508 A1 Jun. 22, 2023

Related U.S. Application Data

(63) Continuation of application No. 16/642,709, filed on Feb. 27, 2020, now Pat. No. 11,612,942.

(51) Int. Cl.
*B23C 5/10* (2006.01)
*B23C 5/20* (2006.01)

(52) U.S. Cl.
CPC ............ *B23C 5/1072* (2013.01); *B23C 5/202* (2013.01); *B23C 2200/0494* (2013.01)

(58) Field of Classification Search
CPC ..... B23C 2200/0494; B23C 5/00; B23C 5/20; B23C 5/1072; B23C 5/207; B23C 5/06
See application file for complete search history.

(56) References Cited

U.S. PATENT DOCUMENTS

| | | | | |
|---|---|---|---|---|
| 5,454,671 A * | 10/1995 | Qvarth | ................... | B23C 5/202 407/42 |
| 5,800,100 A * | 9/1998 | Krenzer | ................ | B23B 27/145 408/230 |
| 5,951,212 A * | 9/1999 | Emoto | .................. | B23C 5/2213 407/34 |
| 5,967,710 A * | 10/1999 | Krenzer | ................ | B23B 27/141 408/233 |
| 6,851,897 B2 * | 2/2005 | Kubo | ................... | B23C 5/2213 407/61 |
| 2017/0066065 A1 * | 3/2017 | Burtscher | .............. | A61K 36/66 |

* cited by examiner

*Primary Examiner* — Nicole N Ramos
(74) *Attorney, Agent, or Firm* — Corinne R. Gorski (57) ABSTRACT

A milling insert for a side and face milling tool includes an upper side defining an upper extension plane, a lower side defining a lower extension plane, and a side surface extending between the upper and the lower sides around a periphery of the insert that includes a main radial clearance surface, two opposite axial clearance surfaces and two corner clearance surfaces. At least one cutting edge is formed in a transition between the upper and the side surfaces, wherein each cutting edge includes a main cutting edge extending above the main radial clearance surface and two corner cutting edges extending above the corner clearance surfaces on opposite sides of the main cutting edge. The main cutting edge slopes downward toward a midpoint of the main cutting edge and the main cutting edge and the main radial clearance surface slope outward from the corner cutting edges toward the midpoint.

13 Claims, 7 Drawing Sheets

MILLING INSERT AND A SIDE AND FACE MILLING TOOL

RELATED APPLICATION DATA

This application is a continuation of U.S. patent application Ser. No. 16/642,709 filed Feb. 27, 2020, which is a § 371 National Stage Application of PCT International Application No. PCT/EP2018/065359 filed Jun. 11, 2018 claiming priority to EP 17188207.9 filed Aug. 28, 2017.

TECHNICAL FIELD

The present disclosure relates to a milling insert for a side and face milling tool and a side and face milling tool.

BACKGROUND

A multi-purpose side and face milling tool can be used in several different applications, including grooving, parting off, shoulder, face and gang milling applications. The side and face milling tool includes a milling disc equipped with milling inserts providing cutting edges along the periphery, as well as one or both sides of the milling disc.

Milling discs with cutting edges along the periphery and both sides are typically used for grooving (or parting off) and gang milling applications. A groove with two plane, mutually parallel side surfaces and a bottom surface can thereby be machined in a workpiece. The bottom surface of the groove is machined by main cutting edges of the milling inserts extending along the periphery of the milling disc, whereas the side surfaces of the groove are machined by secondary wiper cutting edges extending perpendicularly to the main cutting edges and along the sides of the milling disc. The corners between the bottom surface and the side surfaces of the groove are machined by corner cutting edges extending between the main and secondary wiper cutting edges on the milling inserts.

Several milling discs may thereby be provided on an arbor (shaft) for gang milling of several grooves at the same time. A single milling disc may also be provided at a free (front) end of an arbor (shaft) for milling a single groove. Such side and face milling tools may only require milling inserts with secondary wiper cutting edges along one side of the milling disc for shoulder and face (front or back face) milling applications.

U.S. Pat. No. 5,454,671 discloses a milling insert for a side and face milling tool. The milling insert has a rectangular basic shape with upper and lower sides connected by a side surface. Cutting edges are formed in a transition between the upper side and the side surface, with a straight main cutting edge extending above a main radial clearance surface. On each side of the main cutting edge, a corner cutting edge and a secondary cutting edge extend. The milling insert is symmetric about a middle plane and can therefore be used on either side of the milling disc.

The performance of the milling insert disclosed in U.S. Pat. No. 5,454,671 can be improved in terms of tool life in particular when milling in stainless steel, titanium and heat resistant super alloy materials.

SUMMARY

An objective of the present disclosure is to achieve a milling insert for a side and face milling tool that is particularly suitable for milling in stainless steel, titanium and heat resistant super alloy materials and that, compared to the above discussed prior art milling inserts, has an improved tool life and toughness behavior in such workpiece materials. In particular, it is the objective to achieve such a milling insert, which can attain an improved tool life and toughness, while assuring a high quality on the machined surface. A further objective is to achieve such a milling insert which can also be cost efficiently manufactured.

The present milling includes an upper side including a rake surface and defining an upper extension plane, a lower side opposite to the upper side defining a lower extension plane, wherein a center axis extends perpendicularly through the upper and lower extension planes, a side surface extending between the upper side and the lower side around a periphery of the milling insert, wherein the side surface has a main radial clearance surface, two opposite secondary axial clearance surfaces and two corner clearance surfaces extending between the main radial clearance surface and the secondary axial clearance surfaces, and at least one cutting edge formed in a transition between the upper side and the side surface, wherein each cutting edge includes a main cutting edge formed in a transition between the rake surface and the main radial clearance surface and two corner cutting edges formed in a transition between the rake surface and the corner clearance surfaces.

The milling insert is characterised in that the main cutting edge, as seen in a side view of the milling insert, slopes downward from the corner cutting edges toward a midpoint of the main cutting edge, and that the main cutting edge, as well as the main radial clearance surface, as seen in a top view of the milling insert, slope outward from the corner cutting edges toward the midpoint of the main cutting edge.

The side and face milling tool according to the invention includes a milling disc and at least one of the proposed milling inserts, wherein each of the at least one milling inserts is detachably mounted in an insert seat of the milling disc. At least one milling insert is mounted in an insert seat located on a right hand side of the milling disc, and at least one milling insert is mounted in an insert seat located on a left hand side of the milling disc.

As seen in a side view, the main cutting edge has an overall concave shape with a midpoint which is recessed in comparison with endpoints of the main cutting edge close to the adjacent corner cutting edges. The downward slope of the main cutting edge contributes to reduced cutting forces during machining, in particular in stainless steel, titanium and heat resistant super alloy materials, and thereby also to an improved tool life. Moreover, the toughness behaviour of the milling insert is improved in comparison with a milling insert having a straight (linear) and non-sloping main cutting edge, at least partly due to the gradual entry of the sloping main cutting edge in the workpiece during machining. At the same time, a flat (bottom) surface (in a groove) can be provided by means of the outward slope of the main cutting edge as seen in a top view, i.e., that the midpoint of the main cutting edge is, with respect to the center axis, located outside of a line drawn between two endpoints of the main cutting edge. Preferably, the main cutting edge is hereby convex and continuously curved with at least one radius of curvature. The shape of the cutting edge as seen in a top view compensates for the concave shape as seen in a side view, which otherwise would provide a convex (bottom) surface in the workpiece.

The outward slope, and in some embodiments, convex shape, of the main cutting edge, as seen in a top view, also function to reduce the effect of possible angle errors arising when mounting the milling insert as an effect of manufacturing tolerances. Such angle errors may otherwise lead to steps being generated in a side wall surface of a workpiece when the milling insert is used for face milling. The shape of the main cutting edge thereby enables creation of a smoother side wall surface without steps being formed in the workpiece wall surface during shoulder milling. During groove milling, it also prevents formation of steps in the bottom surface of the groove.

Furthermore, since the main radial clearance surface also has an outward slope, and is preferably convex and continuously curved with at least one radius of curvature, it is possible to reduce the number of grinding operations needed in the production of the milling insert and in a single-pass grinding operation periphery grind the main radial clearance surface including the main cutting edge. The milling insert can thereby be cost efficiently produced with improved control of its shape and manufacturing tolerances. Such grinding of the milling insert also enables the machining of excellent quality surfaces and geometric tolerances in the workpiece.

The main radial clearance surface may be formed as a surface extending all the way between the main cutting edge and the lower side. It is hereby possible to improve the shape and tolerances on the entire surface below the main cutting edge by a cost efficient single-pass grinding operation. This is particularly beneficial for improving the precision/tolerances on an indexable milling insert, wherein a (lower) portion of the main radial clearance surface is also forming a radial support surface for the indexable milling insert.

Alternatively, the milling insert may however have two or more radial clearance surface portions formed at different clearance angles, i.e., upper and lower main radial clearance surface portions. The upper main radial clearance surface portion can hereby be subjected to the single-pass grinding operation, wherein the lower main radial clearance surface portion can be left unground or subjected to a different grinding operation. A sufficient precision on the milling insert may for instance be achieved by only grinding the upper main radial clearance surface portion using the lower portion as a reference in the grinding operation. It may also be beneficial on an indexable milling insert to use a different grinding operation on the lower portion, which is intended for radial support when the milling insert is mounted in a milling disc body.

The milling insert may also be formed with an upper portion of the main radial clearance surface extending partly between the main cutting edge and the lower side, wherein the upper portion is protruding with respect to a lower portion of the main radial clearance surface. This can simplify the grinding of the upper portion, wherein the lower portion may in this case not need to be ground or ground into a different shape.

According to one embodiment, a shape of the main cutting edge as seen in a top view and a shape of at least an upper portion of the main radial clearance surface as seen in an arbitrary section perpendicular to the center axis are identical or essentially identical. Hereby, the main radial clearance surface and the main cutting edge can be ground in a single-pass grinding operation.

Essentially identical is herein intended to mean as identical as possible, taking manufacturing tolerances into account. Arbitrary section is intended to mean a section, which is taken at an arbitrarily selected point along the center axis at the upper portion of the main radial clearance surface.

A shape of the main radial clearance surface, as seen in an arbitrary section perpendicular to the center axis, is independent of the section's position along the center axis. In this way, a grinding wheel can be used to generate the main radial clearance surface in a single-pass. Furthermore, by using the ground main radial clearance surface below the inactive main cutting edge (on an indexable milling insert) as a radial support surface, an improved control/precision on the contact points between the milling disc body and the milling insert is achieved thanks to the ground surface. The support of the milling insert in the milling tool thereby becomes more stable and precise.

According to an embodiment, the main cutting edge, as seen in a top view of the milling insert, is convex. In this embodiment, the main cutting edge is continuously curved without sharp corners.

According to an embodiment, the at least one cutting edge further comprises two opposite secondary cutting edges adjacent to the corner cutting edges, wherein each secondary cutting edge is formed in a transition between the rake surface and a secondary axial clearance surface portion. The secondary cutting edges are configured to machine mutually parallel side surfaces in a groove generated by means of the side and face milling tool comprising at least two milling inserts located at opposite sides of a milling disc. During face or shoulder milling, one of the secondary cutting edges is used to generate a surface on the workpiece. The secondary cutting edge may be linear, or preferably curved with a large radius of curvature such that it appears slightly convex in a top view for a surface-wiping operation of the workpiece surface.

According to an embodiment, each secondary cutting edge slopes downward from the adjacent corner cutting edge. Each secondary cutting edge can slope downward with an inner angle γ of 5-25°, with respect to the upper extension plane. During milling of a 90° angle between the surface generated by the main cutting edge and the surface generated by the secondary cutting edge, the downward slope of the secondary cutting edge facilitates the creation of sufficient clearance between the axial side surface of the (indexable) milling insert and the machined workpiece surface.

According to an embodiment, at least one recess is formed in the main radial clearance surface. The recess can be delimited by a boundary edge having two opposite side edges connected by an upper edge. The recess, which is dimensioned so that it is possible to achieve a two-point radial support on the main radial clearance surface at the opposite side edges of the recess when the milling insert is mounted in the milling disc body, facilitates achievement of a stable support in the milling disc body even though the main radial clearance surface is rounded or slopes outward from the corner clearance surfaces. In particular, this is useful for an indexable milling insert with two opposite cutting edges extending along the upper side, wherein radial support is provided below the currently inactive main cutting edge. In this case, two recesses are formed, one in each main radial clearance surface. The recesses are possible to form in a pressing and sintering operation prior to grinding, and stable support can thereby be ensured without having to grind the recess. The portions of the side surface adjacent the recess form part of the main radial clearance surface and may thus also be curved with the same curvature or curvatures as an upper portion of the main radial clearance surface above the upper edge of the recess. The recess is thus formed in a lower portion of the main radial clearance surface. Preferably, a distance between an upper end of the recess and the midpoint of the main cutting edge should be at least 1 mm.

According to an embodiment, a central portion of the rake surface is recessed with respect to the main cutting edge. The central portion of the rake surface is thereby also recessed with respect to the corner cutting edges and the secondary cutting edges adjacent to the corner cutting edges. The recessed central portion of the rake surface hereby creates a positive rake angle on the rake surfaces at the cutting edges, contributing to smooth chip formation with reduced cutting forces, and reduced risk of vibrations (chatter) during milling.

According to an embodiment, the milling insert is symmetric with respect to a vertical plane including the midpoint of the main cutting edge and the center axis. The corner cutting edges are thereby mutually identical as well as the optional secondary cutting edges and the main cutting edge is divided into identical left hand and right hand portions. This means that the milling insert can be used on either side of a milling disc.

According to an embodiment, each axial clearance surface forms an obtuse inner angle η with the lower extension plane. The milling insert thus has a so called positive shape since the axial clearance surfaces slope inward toward the center axis. In other words, the axial clearance surface is forming a positive axial clearance angle on the milling insert.

The milling insert may also be made double sided with identical upper and lower sides, i.e., with cutting edge(s) extending also around the lower side. In this case, the milling insert may be provided with a waist, maintaining a positive shape along the axial clearance surfaces, but the milling insert may also have a negative shape with side surfaces parallel with the center axis. The main radial clearance surface may in both cases form a right inner angle with the lower extension plane, but it may also be formed at an acute inner angle, such that a negative radial clearance angle is obtained on at least the upper portion of the main radial clearance surface adjacent the main cutting edge. A negative or zero clearance angle on the main radial clearance surface below the main cutting edge increases the toughness/strength on the main cutting edge, which is particularly beneficial when said recess is provided in said lower portion of the main radial clearance surface.

According to an embodiment, at least an upper portion of the main radial clearance surface is continuously curved along its entire extension with at least one radius of curvature as seen in an arbitrary section perpendicular to the center axis. In other words, the upper portion of the main radial clearance surface can in this embodiment be described by a smoothly curved surface. The main radial clearance surface, and the main cutting edge, may be formed with several radii of curvature as seen in a top view or in an arbitrary section perpendicular to the center axis.

If a (lower) portion of the main radial clearance surface is provided with the recess for improved stability in the radial support of the milling insert, the recess will obviously form edges in the lower portion of the main radial clearance surface. However, the lower main radial clearance surface on either side of the recess is hereby preferably continuously curved in the same manner as the upper portion of the main radial clearance surface. In this way the entire main radial clearance surface (except the recess) can be subjected to a single-pass grinding operation including a continuously curved grinding path with at least one radius of curvature.

The curvature may also include several radii of curvature. For example, a left hand portion and a right hand portion of the main cutting edge with at least the upper portion of the main radial clearance surface may be formed with the same radius of curvature, while a middle portion is formed with a smaller radius of curvature. In this case, a transition is formed between the portions so that the main cutting edge and the main radial clearance surface is continuously curved or smooth.

According to an embodiment, the main cutting edge, as seen in a side view, has a slope formed at an inner angle β with respect to the upper extension plane, wherein $3°≤β≤10°$. For example, $4°≤β≤8°$. The angle β is here measured in a side view, between a line parallel with the upper extension plane and a line following a main extension of the right hand or left hand portion of the main cutting edge. The mentioned range is sufficient to provide a reduction of cutting forces and an improved toughness behaviour on the main cutting edge without increasing the risk of edge breakage at for instance the corners of the milling insert.

According to an embodiment, as seen in a top view, a first line is defined between the midpoint of the main cutting edge and a first endpoint or a second endpoint of the main cutting edge, and a second line is defined between the first endpoint and the second endpoint of the main cutting edge, wherein the first line extends at an angle a with respect to the second line, wherein $0.3°≤α≤3°$. For example, $0.7°≤α≤2°$. This angle has an influence on the protrusion of the midpoint with respect to the endpoints of the main cutting edge. Within the mentioned range, sufficient compensation for the concave shape of the main cutting edge as seen in a side view can be achieved in order to obtain a flat bottom surface in a milled groove. The angle α and the angle β may be set in dependence on each other in order to ensure sufficient compensation. The angle a may for instance be provided in the upper part of the range if an overcompensation is desired or in cases when the milling insert is mounted at more negative radial angles (radial tipping-in angles) in the milling disc body.

According to one embodiment, the milling insert has a rectangular basic shape. The milling insert may, in this embodiment, be square or elongated with two main cutting edges extending on both short sides of the elongated rectangular milling insert. It is also possible to arrange the main cutting edges along the long sides of the elongated rectangular milling insert.

Hence, the milling insert is indexable with two identical and alternately usable cutting edges formed in the transition between the upper side and the side surface. The milling insert is, in this case, rectangular with the cutting edges extending on opposite short sides of the center axis. This doubles the tool life of the milling insert compared to a milling insert having a single cutting edge. If the cutting insert is also symmetric as described above, the cutting insert is usable both on a left hand side and a right hand side of a milling disc.

The milling insert may be mounted directly in an insert seat of the side and face milling tool using a fastening member in the form of a screw, a clamp or similar, but it may also be mounted in a cassette which is in turn mounted in the milling disc body and which provides support for the milling insert. It may also be mounted on a shim plate forming a bottom support for the milling insert, wherein the shim plate is in turn supported by the milling disc body.

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

A milling insert 1 suitable for side and face milling according to a first embodiment of the invention is shown in FIGS. 1-6. The milling insert 1 has a rectangular basic shape with an upper side 2 and a lower side 3 connected by a peripheral side surface 4 having two opposite long side surface portions forming axial clearance surfaces 5 and two opposite short side surface portions forming main radial clearance surfaces 6. The upper side 2 defines an upper extension plane $P_U$ and the lower side 3 defines a lower extension plane $P_L$, parallel with the upper extension plane $P_U$. A center axis $C_1$ extends perpendicularly through the upper and lower extension planes $P_U$, $P_L$ and a center screw hole is provided for fastening the milling insert 1 to a milling disc of a milling tool.

The milling insert 1 is, in the shown embodiment, single-sided and rotationally symmetric about the center axis $C_1$. A rake surface 7 is provided on its upper side 2 and its lower side 3 comprises a planar bottom surface 8 extending in the lower extension plane $P_L$, intended to be positioned on a support surface within the milling tool. Two opposite and identical cutting edges 9 are provided in a transition between the upper side 2 and the side surface 4 of the milling insert 1. The milling insert 1 is thereby indexable with two index positions. For ease of understanding, only one of the index positions and one of the cutting edges 9 will be described in detail herein.

Each cutting edge 9 includes a main cutting edge 10, two corner cutting edges 11a, 11b and two secondary cutting edges 12a, 12b. The main cutting edge 10 is elevated with respect to a central portion of the rake surface 7 and extends in a transition between the main radial clearance surface 6 and the rake surface 7. The two secondary cutting edges 12a, 12b extend in a transition between associated axial clearance surface portions 13a, 13b and the rake surface 7. Each of the corner cutting edges 11a, 11b connects one of the secondary cutting edges 12a, 12b with the main cutting edge 10. Directly below the corner cutting edges 11a, 11b, corner clearance surfaces 14a, 14b extend and connect the main radial clearance surface 6 to each of the axial clearance surface portions 13a, 13b.

The milling insert 1 is mirror symmetric with respect to a vertical plane including a midpoint $p_{mid}$ of the main cutting edge 10 and the center axis $C_1$, dividing the cutting edge 9 into a left hand portion and a right hand portion including a left hand portion 15a and a right hand portion 15b of the main cutting edge 10. When used in a side and face milling tool, the milling insert 1 can be mounted with either one of the right hand and the left hand portions forming an active cutting edge as will be further described below with reference to FIGS. 8-12 showing a multi-purpose side and face milling tool.

Figure 6:
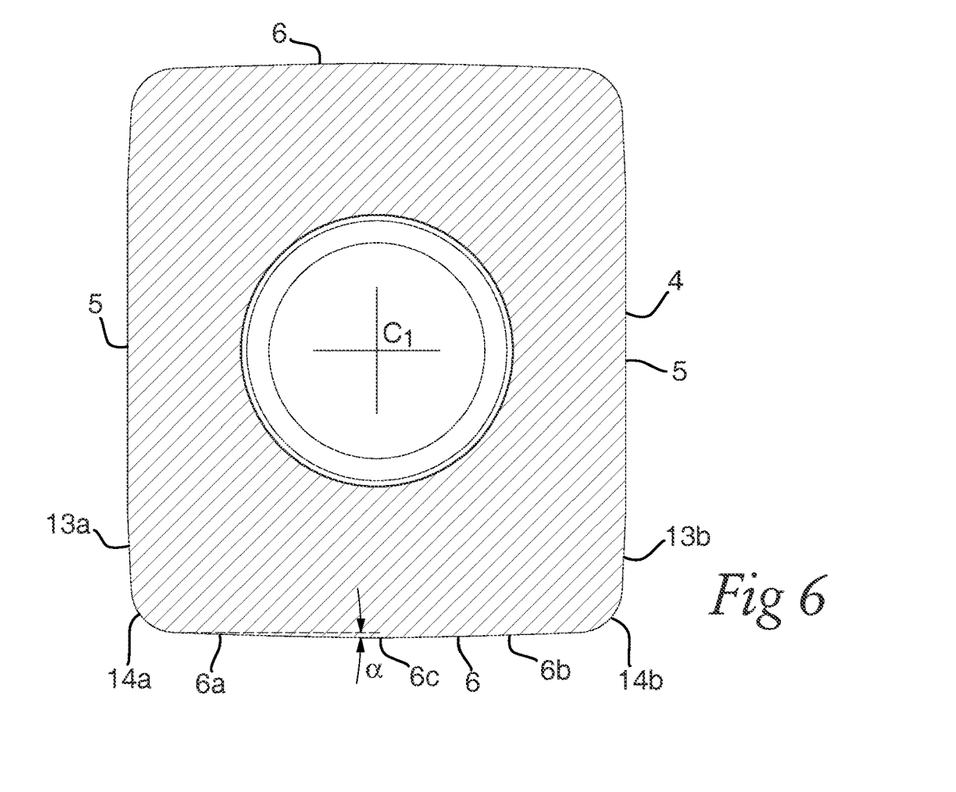
FIG. 6 is a cross-section taken along line VI-VI of FIG. 3.

The main radial clearance surface 6 extends at a right angle with respect to the lower extension plane $P_L$, while the axial clearance surfaces are inclined with respect to the lower extension plane $P_L$ with an obtuse inner angle η, which should typically be within the range 95°-110°. The axial clearance surface portions 13a, 13b are further slightly inclined with respect to main portions of the axial clearance surface 5 as can be seen in FIGS. 3 and 6.

Figure 1:
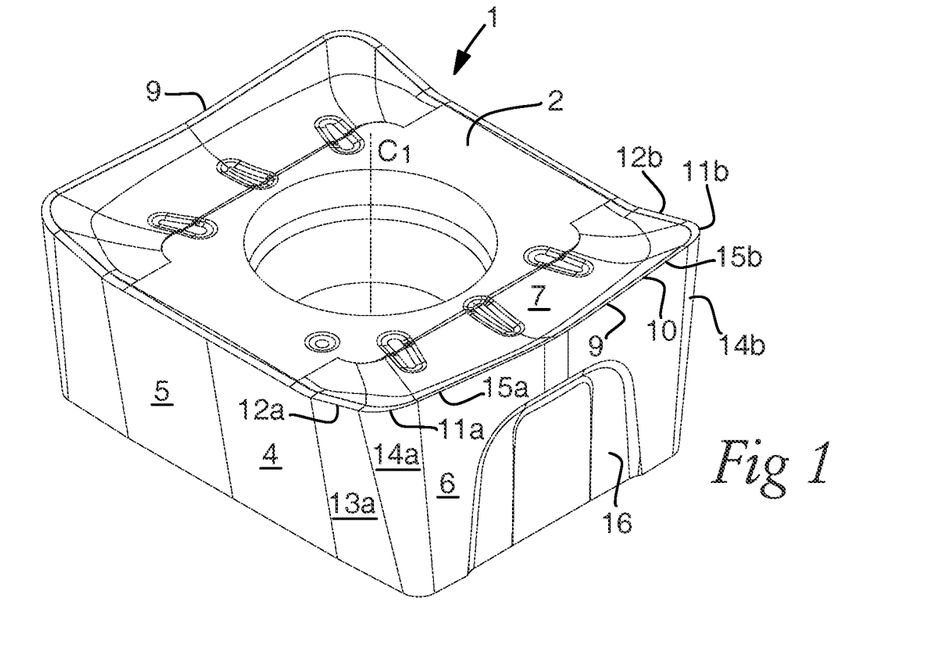
FIG. 1 is a perspective view of a milling insert according to a first embodiment.
Figure 2:
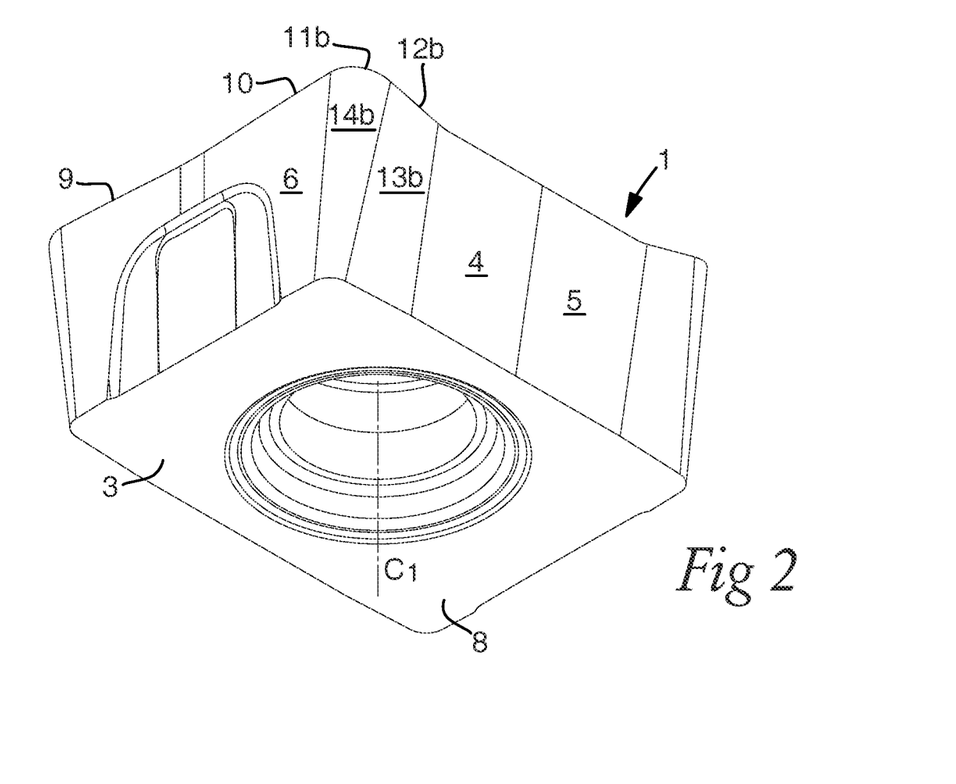
FIG. 2 shows another perspective view of the milling insert of FIG. 1.
Figure 3:
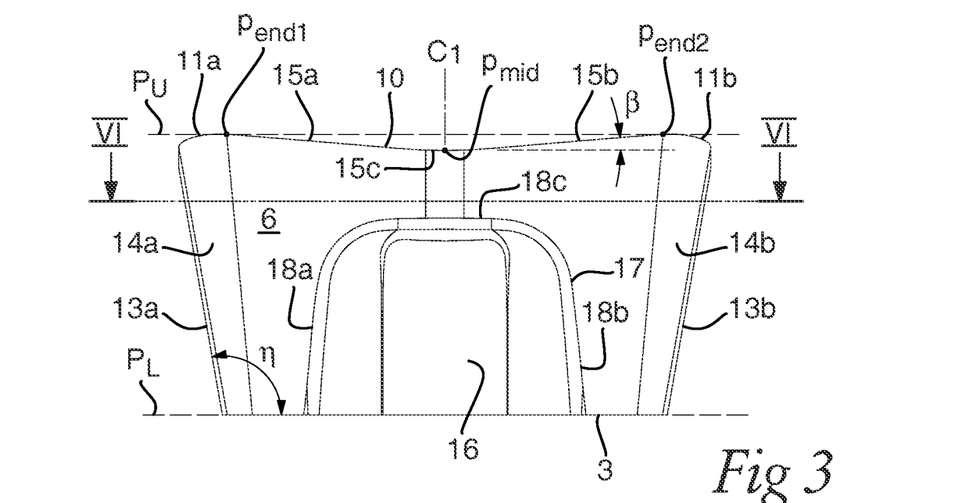
FIG. 3 is a side view of the milling insert of FIG. 1.

The milling insert in FIG. 3 is shown in a side view illustrating the main radial clearance surface 6 and the main cutting edge 10. The main cutting edge 10 has a concave shape as seen in this view. Hence, the left hand and right hand portions 15a, 15b of the main cutting edge 10 slope downward from the adjacent corner cutting edges 11a, 11b toward the midpoint pima such as to form an acute inner angle β with respect to the upper extension plane $P_U$. The angle β may be within the range 3-10°, or for example, 4-8°. In the shown embodiment, the angle β is 5°. The angle β is measured between a line parallel with the upper extension plane $P_U$ and a line between the midpoint $p_{mid}$ of the main cutting edge 10 and an endpoint $p_{end2}$ of the main cutting edge 10. In this embodiment, the left hand and right hand portions 15a, 15b of the main cutting edge 10 are essentially straight as seen in the side view, with a curved middle portion 15c connecting the left hand and right hand portions 15a, 15b.

Figure 5:
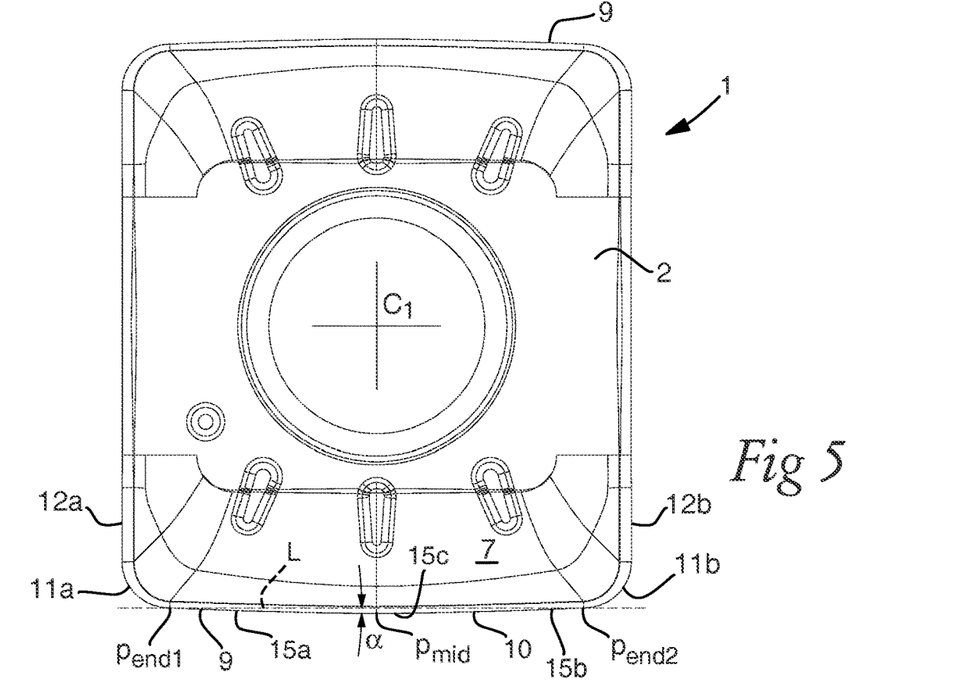
FIG. 5 is a top view of the milling insert of FIG. 1.

In the top view shown in FIG. 5, the main cutting edge 10 is convex with the midpoint $p_{mid}$ located outside an imaginary line L between endpoints $p_{end1}$, $p_{end2}$ of the main cutting edge 10, i.e., the main cutting edge 10 slopes outward from the corner cutting edges 11a, 11b toward the midpoint $p_{mid}$ as seen in the top view. An angle α, measured between a line connecting the midpoint $p_{mid}$ and one of the endpoints penal of $p_{end1}$ the main cutting edge and the imaginary line L, should preferably be within the range 0.3-3°, or 0.7-2°. In the shown embodiment, α=1.7°.

As seen in the top view, the main cutting edge 10 is continuously curved with the left hand portion 15a and the right hand portion 15b formed with the same radius of curvature, approximately 100 mm, while the middle portion 15c is formed with a smaller radius of curvature of approximately 25 mm. A transition is formed between the portions 15a, 15b, 15c so that the main cutting edge 10 is continuously (smoothly) curved.

The main radial clearance surface 6 is also convex as seen in an arbitrary section perpendicular to the center axis $C_1$, such as shown in FIG. 6. In other words, the main radial clearance surface slopes outward from the corner clearance surfaces 14a, 14b toward an imaginary line (not shown) parallel with the center axis $C_1$, extending through the midpoint $p_{mid}$ of the main cutting edge 10. As seen in the arbitrary section, at least an upper portion of the main radial clearance surface 6 has the same shape with the same curvatures that the main cutting edge 10 has in the top view. The main radial clearance surface 6 thus has a left hand portion 6a and a right hand portion 6b sharing a common radius of curvature of approximately 100 mm and a middle portion 6c with a radius of curvature of approximately 25 mm. Of course, the main radial clearance surface 6, as well as the main cutting edge 10, may instead be formed with a single radius of curvature or with several radii of curvature forming differently curved convex portions.

A recess 16 is formed in each main radial clearance surface 6, extending in a lower portion of the main radial clearance surface 6 from the lower side and more than halfway up to the main cutting edge 10. The recess 16 is configured such that stable radial support can be provided when the milling insert 1 is mounted in a milling tool as will be further described below. The recess 16 is delimited by a boundary edge 17 having two opposite side edges 18a, 18b and an upper edge 18c connecting the side edges 18a, 18b (see FIG. 3).

Figure 4:
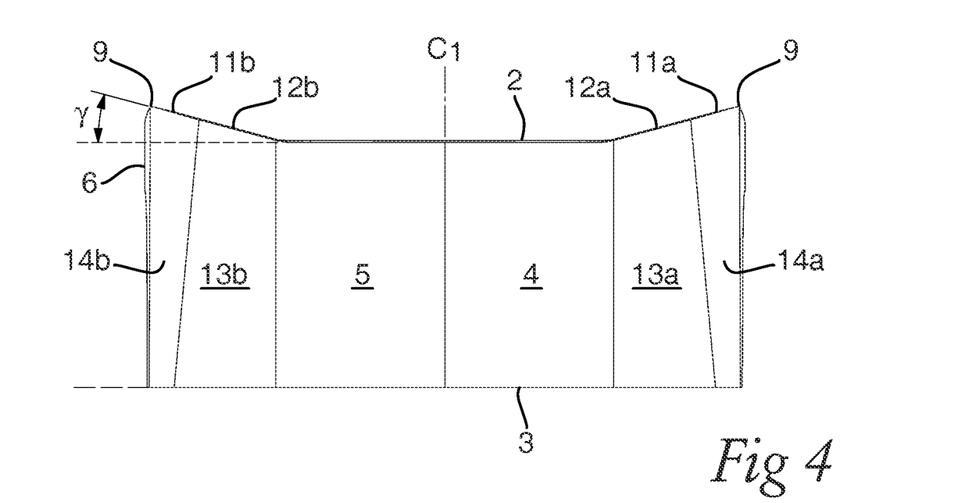
FIG. 4 is another side view of the milling insert of FIG. 1.

Each corner cutting edge 11a, 11b and secondary cutting edge 12a, 12b, as seen in the side view in FIG. 4, slope downward from a bisector of the corner cutting edge 11a, 11b with a common inner angle γ of 15° with respect to the upper extension plane $P_U$.

Figure 7:
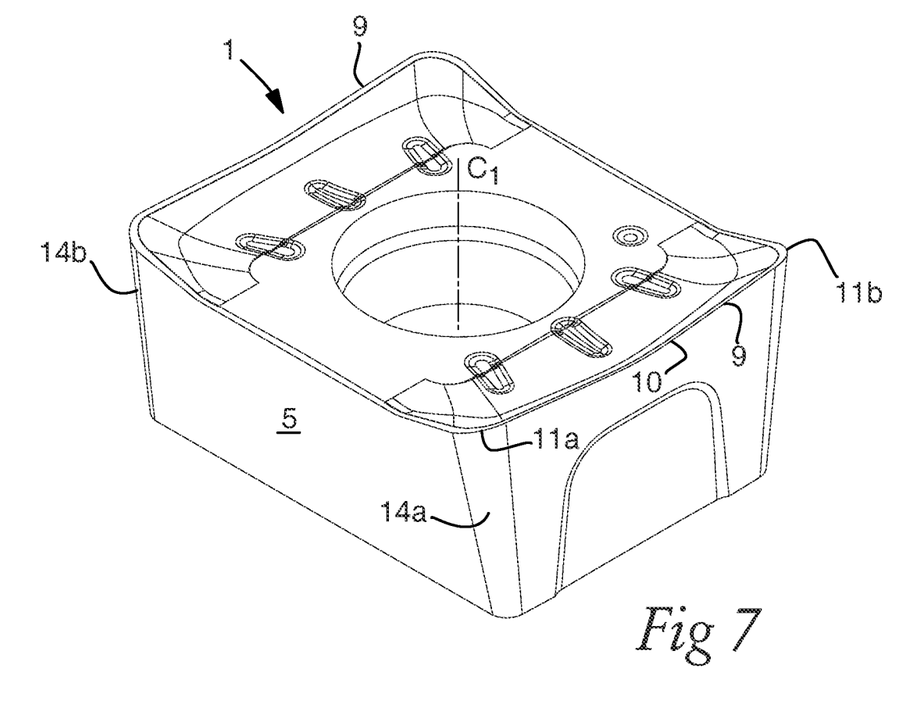
FIG. 7 is a perspective view of a milling insert according to a second embodiment.
Figure 8:
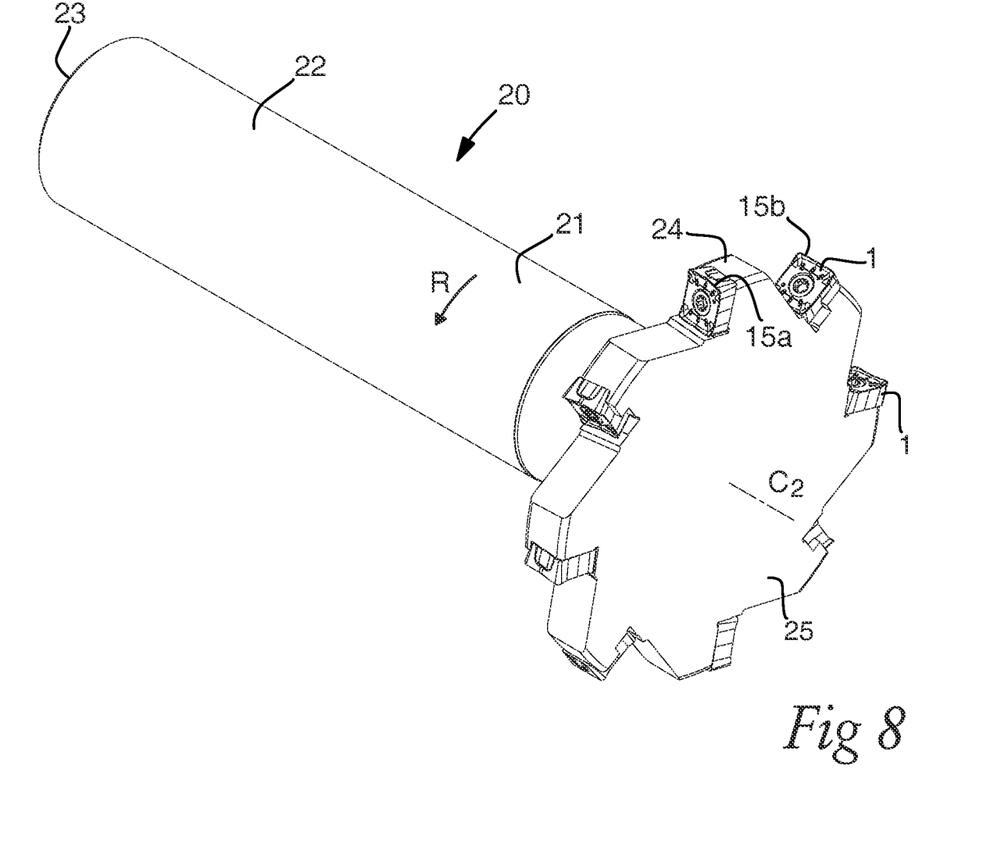
FIG. 8 is a perspective view of a milling tool according to the invention.
Figure 9:
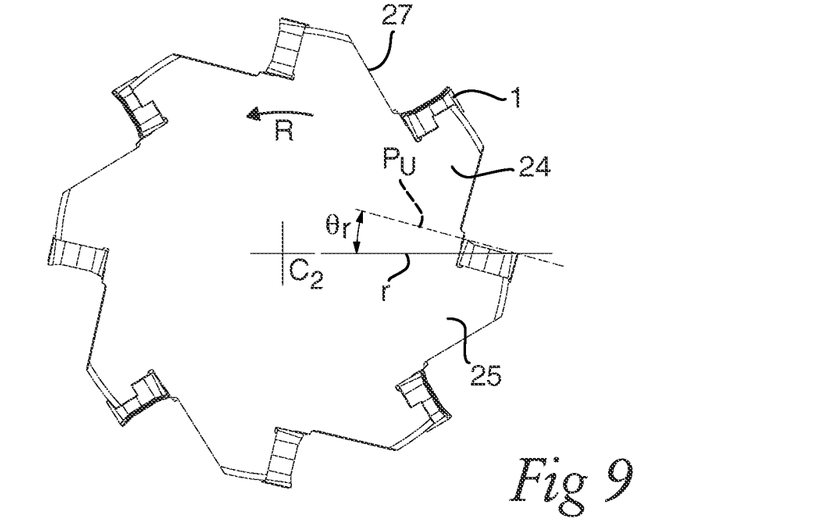
FIG. 9 is an end view of the milling tool of FIG. 8.
Figure 10:
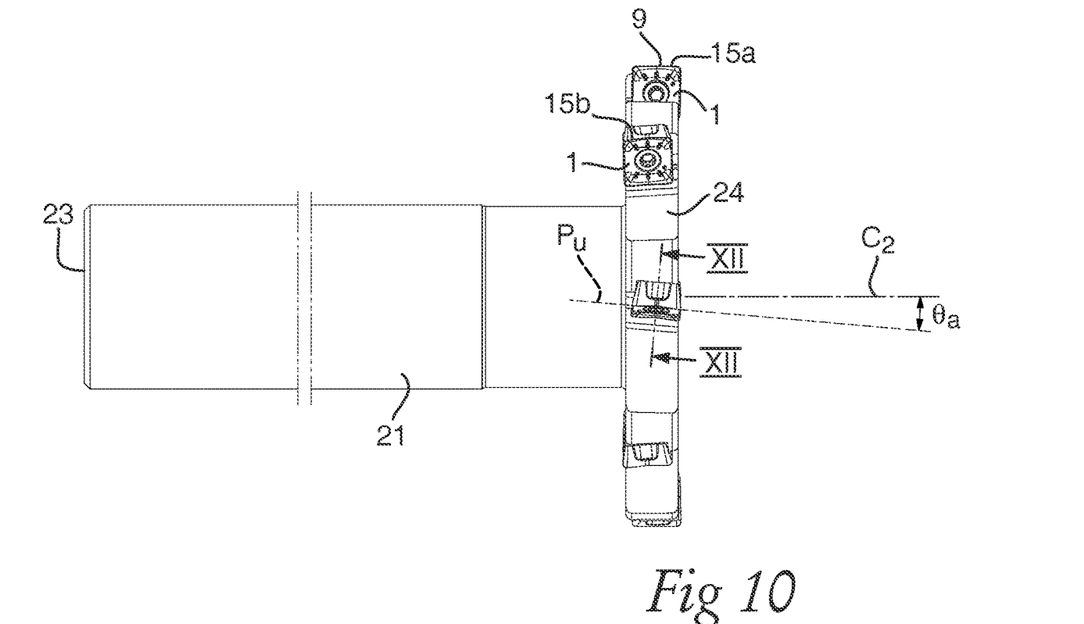
FIG. 10 is a side view of the milling tool of FIG. 8.

A second embodiment of a milling insert 1 is shown in FIG. 7. The milling insert 1 only differs from the milling insert 1 according to the first embodiment shown in FIGS. 1-6 in that it lacks secondary cutting edges. Instead, each cutting edge 9 only has a main cutting edge 10 and two corner cutting edges 11a, 11b. Consequently, the axial clearance surface 5 is in the form of a flat surface extending between the opposite corner clearance surfaces 14a, 14b.

A multi-purpose side and face milling tool 20 (hereinafter referred to as a milling tool) according to an embodiment of the invention is shown in FIGS. 8-12. The milling tool 20 includes a tool body 21 having a shaft 22 extending along a longitudinal axis $C_2$ around which the tool body 21 is rotatable in a direction of rotation R. A rear end 23 of the tool body 21 is configured for mounting to a tool spindle or similar, and a milling disc 24 is provided at a front end 25 of the tool body 21. Around a periphery of the milling disc 24, a plurality of milling inserts 1, according to the embodiment shown in FIGS. 1-6, are detachably mounted in insert seats 26 of the milling disc 24. The milling inserts 1 are alternately mounted with the left and right hand portions 15a, 15b of the main cutting edges 10 configured to be active in a milling operation. Chip pockets 27 are provided ahead of the milling inserts 1 in the direction of rotation R.

Figure 11:
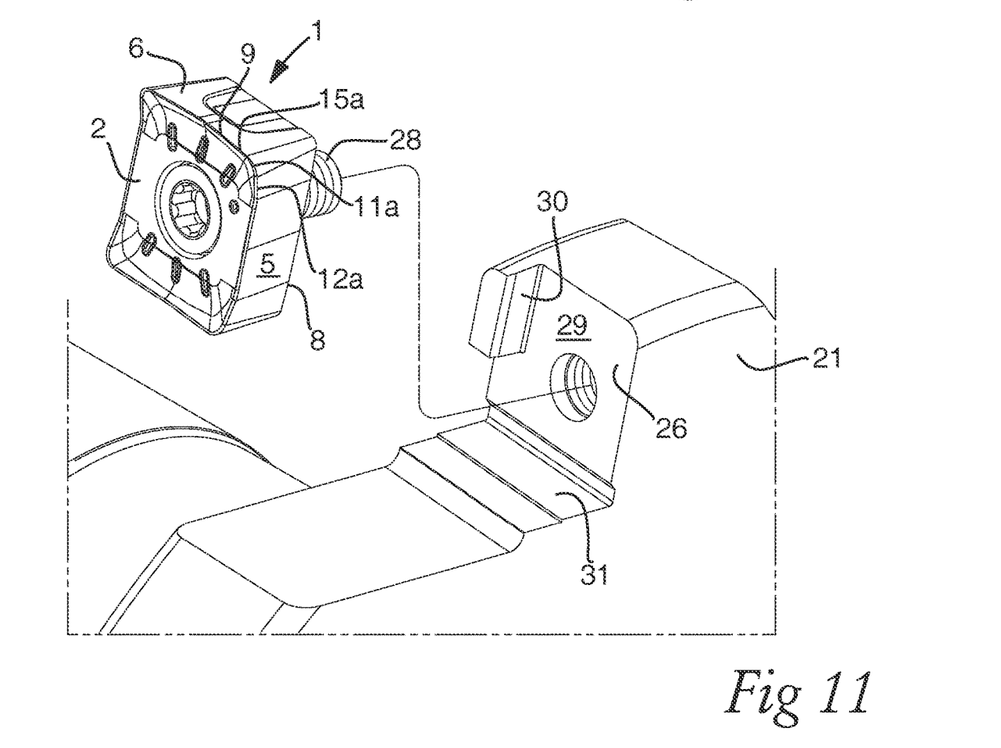
FIG. 11 is a detail of the milling tool of FIG. 8.

FIG. 11 shows how one of the milling inserts 1 is mounted in the milling disc 24 by means of a screw 28. The bottom surface 8 of the milling insert 1 is configured to rest against a tangential support surface 29 provided in the insert seat 26, providing support for the milling insert 1 in a tangential direction of the milling tool 1, i.e., in the direction of rotation R. The tangential support surface 29 is tilted both with respect to the longitudinal axis $C_2$ of the milling tool 20 and with respect to a radial direction of the milling tool 20. A radial tipping-in angle $\theta_r$, i.e., the angle between the upper extension plane $P_U$ of the milling insert 1 and a line r in the radial direction of the milling tool 20, is negative so that sufficient radial clearance is achieved behind the main cutting edge 10.

In the shown embodiment, the radial tipping-in angle $\theta_r$ is −15°, but it may vary between e.g. −5° to −20°, or −7° to −15°. An axial tipping-in angle $\theta_a$, i.e., the angle between the upper extension plane $P_U$ of the milling insert 1 and the central rotation axis $C_2$ of the milling tool 20, is alternately arranged for left hand cutting edge active and right hand cutting edge active, wherein the axial clearance surfaces 5 of the milling insert 1 are inclined with respect to the lower extension plane $P_L$. In the shown embodiment, the axial tipping-in angle $\theta_a$ has a positive value of 5°, but it may vary between 0°-20°, or 4°-10°.

Figure 12:
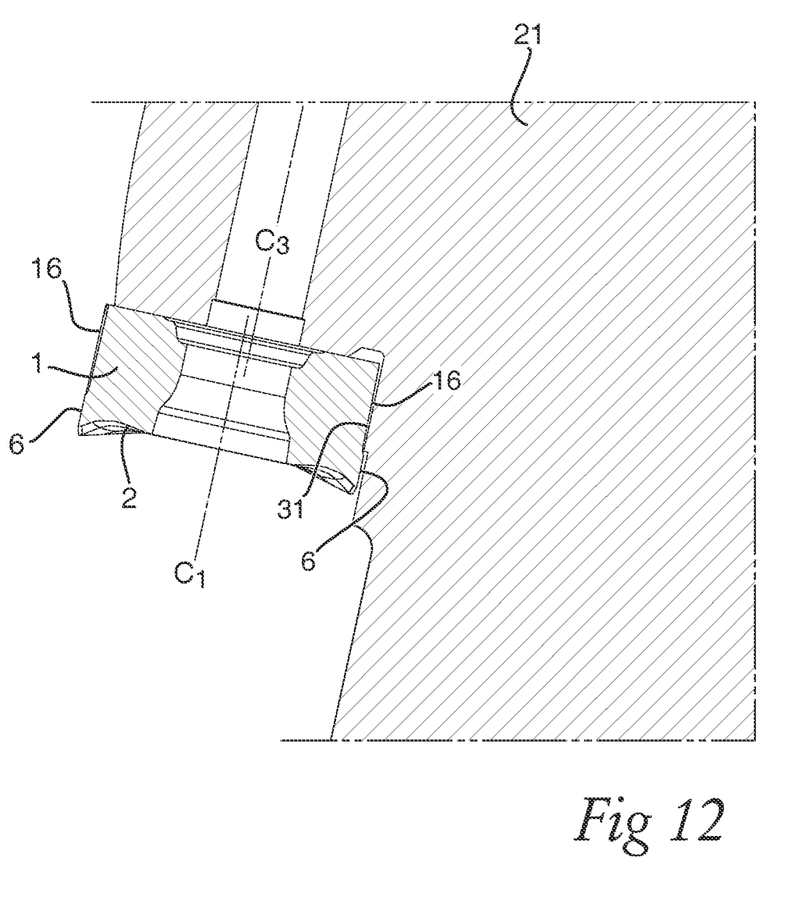
FIG. 12 is a cross-section taken along the line XII-XII of FIG. 10.

In FIG. 11, the insert seat 26 is configured for mounting a milling insert with the left hand portion 15a of the main cutting edge 10, the left hand corner cutting edge 11a and the left hand secondary cutting edge 12a being active in the milling operation. An axial support surface 30 is provided in the milling disc 24 for supporting the inactive side of the milling insert 1, with the inactive axial clearance surface 5 of the milling insert 1 resting against the axial support surface 30. A radial support surface 31 is provided for supporting the milling insert 1 in a radial direction of the milling tool 20. In the shown embodiment, the radial support surface 31 is configured to support the inactive radial clearance surface 6 of the milling insert 1 at the level of the recess 16 as illustrated in the section of FIG. 12, showing the milling insert 1 and the insert seat 26 with the screw removed. Contact points between the milling insert 1 and the radial support surface 31 will be slightly altered as the milling insert 1 is mounted using the screw 28 and the center axis $C_1$ of the milling insert 1 is adjusted to coincide with an axis $C_3$ of the screw hole provided in the milling disc 24. The actual contact points will be located at the side edges 18a, 18b of the boundary edge 17 of the recess 16. Since the inactive radial clearance surface 6 is curved, the recess 16 ensures that a stable radial support can be achieved. Of course, the same effect can be achieved by instead providing a recess in the radial support surface of the milling disc.

When milling a groove in a workpiece using the shown milling tool the main cutting edges 10 generate a bottom surface of the groove and the secondary cutting edges 12a, 12b generate side surfaces within the groove. The downward slope of the main cutting edge 10 as seen in a side view reduces the cutting forces since the main cutting edge 10 gradually enters the workpiece, with the endpoint $p_{end1}$, $p_{end2}$ of the main cutting edge being closest to the active corner cutting edge 11a, 11b first entering the workpiece. The convex shape of the main cutting edge 10 as seen in a top view compensates for the sloping main cutting edge 10 by removing material from a middle part of the groove, so that the machined bottom surface becomes flat.

The milling insert 1 may be obtained from an insert blank produced by means of pressing and sintering in a powder metallurgy process. The milling insert blank is thereafter periphery ground to create the cutting edges 9 and the side surface 4, including the curved radial clearance surface 6. An advantage with the milling insert according to the invention is that the cutting edges 9 and the side surface 4 can be ground in a single-pass grinding operation to simultaneously produce the rounded main cutting edge 10 and the rounded radial clearance surface 6.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

What is claimed is:

1. A milling insert for a side and face milling tool, comprising:
   an upper side having a rake surface and defining an upper extension plane;
   a lower side opposite the upper side, the lower side defining a lower extension plane, wherein a center axis extends perpendicularly through the upper and lower extension planes;
   a side surface extending between the upper side and the lower side around a periphery of the milling insert, wherein the side surface includes a main radial clearance surface, two opposite secondary axial clearance surfaces, and two corner clearance surfaces extending between the main radial clearance surface and the secondary axial clearance surfaces; and at least one cutting edge formed in a transition between the upper side and the side surface, wherein each cutting edge includes a main cutting edge formed in a transition between the rake surface and the main radial clearance surface and two corner cutting edges formed in a transition between the rake surface and the corner clearance surfaces, wherein the main cutting edge, as seen in a side view of the milling insert, slopes downward from the corner cutting edges toward a midpoint of the main cutting edge, and wherein the main cutting edge, as well as the main radial clearance surface, as seen in a top view of the milling insert, both slope outward from the corner cutting edges toward the midpoint of the main cutting edge, wherein a shape of the main cutting edge as seen in the top view and a shape of at least an upper portion of the main radial clearance surface as seen in an arbitrary section perpendicular to the center axis are identical or essentially identical.

2. The milling insert according to claim 1, wherein the main cutting edge, as seen in the top view of the milling insert, is convex.

3. The milling insert according to claim 1, wherein the at least one cutting edge further includes two opposite secondary cutting edges adjacent to the corner cutting edges, wherein each secondary cutting edge is formed in a transition between the rake surface and a secondary axial clearance surface portion.

4. The milling insert according to claim 3, wherein each secondary cutting edge slopes downward from the adjacent corner cutting edge.

5. The milling insert according to claim 1, wherein at least one recess is formed in the main radial clearance surface.

6. The milling insert according to claim 1, wherein a central portion of the rake surface is recessed with respect to the main cutting edge.

7. The milling insert according to claim 1, wherein the milling insert is symmetric with respect to a vertical plane including the midpoint (pima) of the main cutting edge and the center axis.

8. The milling insert according to claim 1, wherein each axial clearance surface forms an obtuse inner angler' with the lower extension plane.

9. The milling insert according to claim 1, wherein at least an upper portion of the main radial clearance surface is continuously curved along its entire extension with at least one radius of curvature as seen in an arbitrary section perpendicular to the center axis.

10. The milling insert according to claim 1, wherein the main cutting edge, as seen in the side view of the milling insert, has a slope formed at an inner angle $\beta$ with respect to the upper extension plane, wherein $3° \leq \beta \leq 10°$.

11. The milling insert according to claim 1, wherein, as seen in the top view of the milling insert, a first line is defined between the midpoint of the main cutting edge and a first endpoint or a second endpoint of the main cutting edge, and a second line is defined between the first endpoint and the second endpoint, wherein the first line extends at an angle a with respect to the second line, wherein $0.3° \leq \alpha \leq 3°$.

12. The milling insert according to claim 1, wherein the milling insert has a rectangular basic shape.

13. The milling insert according to claim 12, wherein the milling insert is indexable with two identical and alternately usable cutting edges formed in the transition between the upper side and the side surface.

* * * * *